US008687881B2

(12) United States Patent
Takahashi et al.

(10) Patent No.: US 8,687,881 B2
(45) Date of Patent: Apr. 1, 2014

(54) IMAGE PROCESSING DEVICE, IMAGE PROCESSING METHOD, AND PROGRAM

(75) Inventors: Yasuaki Takahashi, Kanagawa (JP); Shojiro Shibata, Kanagawa (JP); Seiko Maehara, Kanagawa (JP)

(73) Assignee: Sony Corporation, Tokyo (JP)

( * ) Notice: Subject to any disclaimer, the term of this patent is extended or adjusted under 35 U.S.C. 154(b) by 13 days.

(21) Appl. No.: 13/413,734

(22) Filed: Mar. 7, 2012

(65) Prior Publication Data

US 2012/0243781 A1 Sep. 27, 2012

(30) Foreign Application Priority Data

Mar. 23, 2011 (JP) ................................. 2011-064050

(51) Int. Cl.
*G06K 9/36* (2006.01)
*G06K 9/46* (2006.01)

(52) U.S. Cl.
USPC ........................... 382/166; 382/232; 382/239

(58) Field of Classification Search
None
See application file for complete search history.

(56) References Cited

U.S. PATENT DOCUMENTS

| 5,907,374 | A | * | 5/1999 | Liu | 375/240.26 |
|---|---|---|---|---|---|
| 5,940,130 | A | * | 8/1999 | Nilsson et al. | 375/240.12 |
| 6,097,838 | A | * | 8/2000 | Klassen et al. | 382/167 |
| 6,343,153 | B1 | * | 1/2002 | Kawasaki et al. | 382/239 |
| 6,389,174 | B1 | * | 5/2002 | Liu et al. | 382/240 |
| 6,697,061 | B1 | * | 2/2004 | Wee et al. | 345/419 |
| 6,856,650 | B1 | * | 2/2005 | Takishima et al. | 375/240 |
| 6,970,510 | B1 | * | 11/2005 | Wee et al. | 375/240.2 |
| 7,082,217 | B2 | * | 7/2006 | Shimizu et al. | 382/166 |
| 7,646,925 | B2 | * | 1/2010 | Kato et al. | 382/232 |
| 8,045,618 | B2 | * | 10/2011 | Cote et al. | 375/240.16 |
| 2004/0101041 | A1 | * | 5/2004 | Alexandre et al. | 375/240.1 |
| 2009/0202162 | A1 | * | 8/2009 | Shibata et al. | 382/235 |
| 2012/0093485 | A1 | * | 4/2012 | Takahashi | 386/278 |

FOREIGN PATENT DOCUMENTS

JP 3817952 6/2006
JP 2007-235989 9/2007

* cited by examiner

*Primary Examiner* — Vu Le
*Assistant Examiner* — Alexander J Lesnick
(74) *Attorney, Agent, or Firm* — Frommer Lawrence & Haug LLP; Williams S. Frommer

(57) ABSTRACT

An image processing device including a decoding unit that decodes compressed image data that is an encoded image and generates a decoded image that is decoded and parameters that relate to encoding which are calculated during encoding; an image processing unit that applies image processing including at least a color adjustment process on the decoded image; a control unit that controls whether to encode the decoded image on which image processing has been applied by the image processing unit using the parameters or to encode the decoded image without using the parameters according to processing of the image processing unit; and an encoding unit that encode the decoded image according to a control of the control unit.

8 Claims, 13 Drawing Sheets

IMAGE PROCESSING DEVICE, IMAGE PROCESSING METHOD, AND PROGRAM

BACKGROUND

The present disclosure relates to an image processing device, an image processing method, and a program, and particularly relates to an image processing device with which it is possible to perform processing efficiently when editing videos, an image processing method, and a program.

Moving image signals are encoded using line correlation or inter-frame correlation. As an encoding method, there is an MPEG (Moving Picture Experts Group) method. With regard to systems that transmit moving image signals to remote locations as with video conference systems, video phone systems, and the like, for example, the image signals are encoded using the line correlation or the inter-frame correlation of the video signals in order to make efficient use of transmission paths.

In a case when an image signal is encoded, encoding is performed so that the bit stream that is generated becomes a predetermined bit rate. However, depending on the transmission paths, it may be important to convert the bit rate of the bit stream. In such a case, the encoded information may be once decoded and encoding may be performed again so that the bit rate becomes a predetermined value. In a case when performing such re-encoding, performing re-encoding using motion vectors that are computed in the past has been proposed (for example, Japanese Patent No. 03817952).

Further, reusing parameters when adding edits to a decoded image before encoding once again and when conditions such as the phases of the macro blocks which are I pictures of the previous and current encoding are matching as predetermined conditions has been proposed (for example, Japanese Unexamined Patent Application Publication No. 2007-235989).

SUMMARY

In Japanese Patent No. 03817952, preventing deterioration in image quality even when performing re-encoding using motion vectors that are computed in the past has been proposed. However, for example, when the image is changed by adding an edit to the image, if the parameters that are calculated when the image before editing is encoded are used for the re-encoding of the image on which an editing process has been performed as is, there is a possibility that the image quality of the portion that has been edited may deteriorate.

Therefore, when performing an edit, instead of performing re-encoding using parameters that are calculated when the image before editing is encoded, a process of calculating the parameters by performing regular encoding on the edited image had been performed. In such a case, processing time and processing power for performing re-encoding are taken up.

It is desirable to perform encoding using optimum parameters and to perform efficient encoding when re-encoding.

An image processing device according to an embodiment of the present disclosure includes: a decoding unit that decodes compressed image data that is an encoded image and generates a decoded image that is decoded and parameters that relate to encoding which are calculated during encoding; an image processing unit that applies image processing including at least a color adjustment process on the decoded image; a control unit that controls whether to encode the decoded image on which image processing has been applied by the image processing unit using the parameters or to encode the decoded image without using the parameters according to the processing of the image processing unit; and an encoding unit that encodes the decoded image according to a control of the control unit.

The control unit may determine whether or not image processing has been applied on the decoded image by the image processing unit and in a case when it is determined that image processing has not been applied on the decoded image, may control the encoding unit to execute encoding using the parameters.

The control unit may determine whether or not the image processing applied by the image processing unit is only the color adjustment process, and in a case when it is determined that the image processing is only the color adjustment process, may control the encoding unit to execute encoding using the parameters.

A change amount computation unit that computes a change amount of the decoded image that is decoded by the decoding unit which changes by image processing being applied by the image processing unit may be further included, wherein the control unit may control processing of the encoding unit based on whether or not the change amount is equal to or greater than a predetermined threshold value.

A switching unit that switches whether or not the parameters that are decoded by the decoding unit are supplied to the encoding unit may be further included, wherein the control unit may control the switching unit based on whether or not the change amount is equal to or greater than a predetermined threshold value.

A reference image determination unit that determines whether or not there are changes in a reference image that is referenced when an image that is a processing target of encoding by the encoding unit is encoded may be further included, wherein the control unit may control processing of the encoding unit based on whether or not the change amount is equal to or greater than a predetermined threshold value and based on a determination result by the reference image determination unit.

The control unit may control the encoding unit to execute encoding without using the parameters in a case when the change amount is equal to or greater than a predetermined threshold, control the encoding unit to execute encoding without using the parameters in a case when the change amount is equal to or less than a predetermined threshold and the determination by the reference image determination unit is a determination that there are changes in the reference image that is referenced when the image that is the processing target of encoding is encoded, and control the encoding unit to execute encoding using the parameters in a case when the change amount is equal to or less than a predetermined threshold and the determination by the reference image determination unit is a determination that there are no changes in the reference image that is referenced when the image that is the processing target of encoding is encoded.

A quantization step changing unit that changes the value of a quantization step that is included in the parameters by a change amount according to the change amount computed by the change amount computation unit may be further included, wherein the encoding unit may encode the decoded image using parameters that include the quantization step that is changed by the quantization step changing unit.

An image processing method or a program of an image processing device that includes a decoding unit, an image processing unit, a control unit, and an encoding unit according to other embodiments of the present disclosure include: decoding compressed image data that is an encoded image and generating a decoded image that is decoded and parameters that relates to encoding which are calculated during encoding by the decoding unit; applying image processing on the decoded image which includes at least a color adjustment process by the image processing unit; and controlling the encoding unit to execute encoding using the parameters with respect to the decoded image in which image processing is applied by the image processing unit or controlling the encoding unit to execute encoding without using the parameters by the encoding unit according to the processing of the image processing unit by the control unit.

According to the image processing device, the image processing method, and the program according to the embodiments of the present disclosure, compressed image data that is an encoded image is decoded, a decoded image that is decoded and parameters that relate to encoding which are calculated during encoding are generated, image processing that includes at least a color adjustment process is applied on the decoded image, and encoding using the parameters or encoding without using the parameters is executed on the decoded image according to the image processing.

According to the embodiments of the present disclosure, encoding is able to be performed. Further, encoding using appropriate parameters is able to be performed.

DETAILED DESCRIPTION OF EMBODIMENTS

The embodiments of the present disclosure will be described below with reference to the drawings.

Editing Machine as Image Processing Device According to First Embodiment

Figure 1:
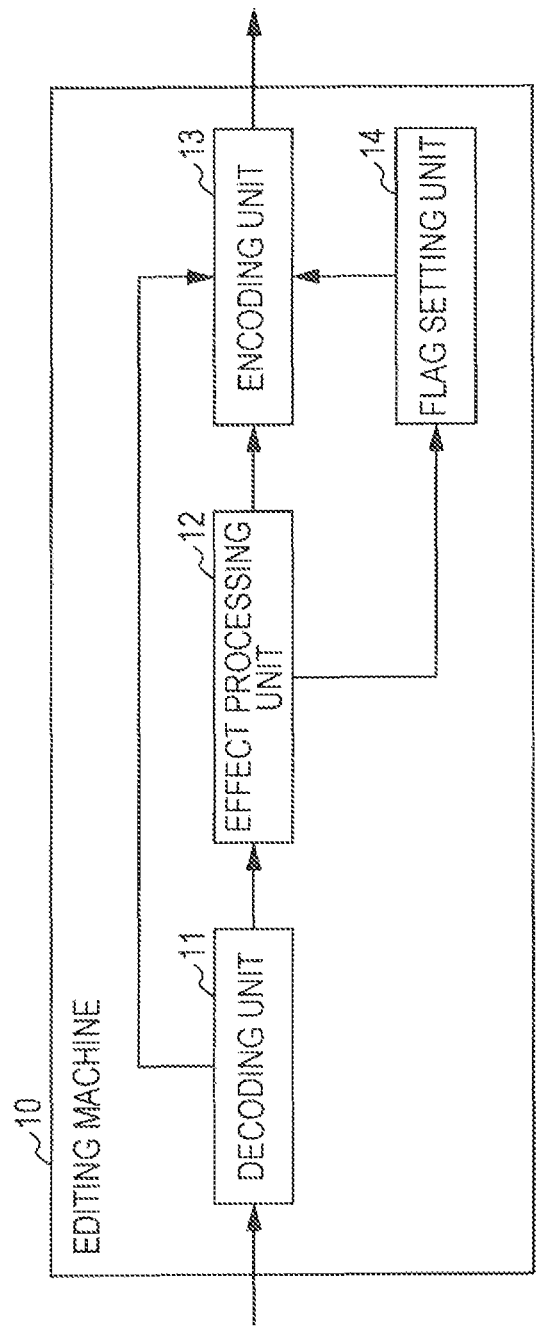
FIG. 1 is a diagram that illustrates the configuration of an editing machine according to a first embodiment.

FIG. 1 is a diagram that illustrates the configuration of a first embodiment of an editing machine 10 as an image processing device. The editing machine 10 illustrated in FIG. 1 is configured by a decoding unit 11, an effect processing unit 12, an encoding unit 13, and a flag setting unit 14. An encoded image signal (stream) is input into the decoding unit 11. The decoding unit 11 decodes the input stream and outputs the image that is decoded (hereinafter referred to as the decoded image) and decoded parameters that are included in the stream which are calculated during the encoding. The decoded image from the decoding unit 11 is supplied to the effect processing unit 12 and the parameters are supplied to the encoding unit 13.

The effect processing unit 12 applies effect processing on the input decoded image based on an instruction from the user. Effect processing is image processing such as, for example, color correction that changes the brightness of colors, telops that display characters over an image by superimposition, and inserts of inserting characters, images, computer graphics, and the like into a predetermined scene. A decoded image on which effect processing is applied by the effect processing unit 12 or a decoded image on which effect processing is not applied since effect processing is not instructed is supplied to the encoding unit 13. Further, information that relates to effect processing is supplied from the effect processing unit 12 to the flag setting unit 14.

The flag setting unit 14 operates a flag when it is recognized from the information that relates to the effect processing that a predetermined effect has been applied, and supplies information on the flag to the encoding unit 13. The encoding unit 13 encodes the decoded image that is supplied from the effect processing unit 12. When encoding, when the flag that is supplied from the flag setting unit 14 is raised, encoding is performed using the parameters from the decoding unit 11, and when the flag that is supplied from the flag setting unit 14 is not raised, normal encoding is performed without using the parameters from the decoding unit 11. In such a manner, the flag setting unit 14 includes the function as a control unit that controls the encoding by the encoding unit 13.

The editing machine 10 performs a process of decoding the encoded image signals, adding edits (effects) to the decoded image, and re-encoding. The processes of the editing machine 10 will be described with reference to the flowchart of FIG. 2.

In step S11, a stream is input into the editing machine 10. In step S12, the input stream is supplied to the decoding unit 11 and decoded. The input stream is, for example, a moving image signal that is captured by a video camera, and is compressed data that is encoded by a predetermined encoding method such as MPEG. The decoding unit 11 decodes by a decoding method that corresponds to the encoding method of the input stream. The decoded image that is decoded by the decoding unit 11 is supplied to the effect processing unit 12.

In step S13, effect processing is applied on the decoded image by the effect processing unit 12. The effect processing unit 12 applies effects based on an instruction from a user using a user interface configured by a display, a keyboard, and the like (not shown) on the decoded image. For example, in a case when the user wishes to apply the effect of a telop that superimposes predetermined characters on a decoded image that is displayed on a display, an instruction for superimposing the characters to be superimposed on the positions to be superimposed onto using a predetermined input device such as a keyboard or a mouse. In a case when such an instruction is given, the effect processing unit 12 applies an effect that corresponds to the instruction from the user on the decoded image.

The decoded image on which the effect is applied is supplied to the encoding unit 13. An encoded image (hereinafter referred to as a first encoded image as appropriate) is input to the editing machine 10, the first encoded image is decoded, a decoded image is generated, and an effect is applied on the decoded image. Furthermore, the editing machine 10 encodes the decoded image on which the effect is applied, generates a second encoded image, and outputs the second encoded image to a processing unit of a later stage (not shown).

An image that is generated by the compressed image data that is the encoded image that is input to the editing machine 10 being decoded by the decoding unit 11 is referred to as a decoded image. Compressed image data that is the encoded image that is input to the editing machine 10 is referred to as a first encoded image. Further, compressed image data that is an image encoded by the encoding unit 13 is referred to as a second encoded image.

While the first encoded image is an image that is encoded by another device, there are parameters (first parameters) that were used during such encoding. As the first parameters, there is the Q value, a prediction mode, and the like. The first parameters are included in the stream along with the data of the first encoded image, and decoded by the decoding unit 11. The editing machine 10 illustrated in FIG. 1 is configured so that the first parameters are supplied from the decoding unit 11 to the encoding unit 13. The encoding unit 13 is configured so that encoding is able to be performed on the decoded image on which an effect is applied using the first parameters.

For example, in a case when the second encoded image generated by decoding the first encoded image and encoding the first encoded image once again by the encoding unit 13 without applying effect processing, by the encoding unit 13 performing encoding using the first parameters, the encoding becomes the same state as the first encoded image, and as a result, it is possible to generate a second encoded image that is close to the first encoded image.

Accordingly, in a case when effect processing is not applied by the effect processing unit 12, by using the first parameters it is possible to suppress deterioration in the image quality by the re-encoding. Further, by re-encoding being performed using the first parameters, since the time taken in processes such as setting the parameters is able to be reduced, it is possible to shorten the time taken in the encoding, leading to an improvement in the processing speed.

However, if re-encoding using the first parameters is performed on the decoded image on which effect processing is applied by the effect processing unit 12, there is a possibility that the second encoded image is not correctly encoded and the image quality deteriorates when the second encoded image is decoded. Accordingly, encoding using the first parameters is not performed on the decoded image on which effect processing is applied by the effect processing unit 12, and the encoding unit 13 performs normal encoding, that is, an encoding process of generating second parameters that are suited to the second encoded image.

The encoding unit 13 performs encoding using the first parameters decoded by the decoding unit 11 on an image on which effect processing by the effect processing unit 12 has not been applied, generates a stream that includes the image data of the second encoded image that is generated as a result and the first parameters, and outputs the stream to later processing. Further, the encoding unit 13 does not perform encoding using the first parameters decoded by the decoding unit 11 on an image on which effect processing by the effect processing unit 12 has been applied, generates a stream that includes the image data of the second encoded image that is generated as a result of performing normal encoding and the second parameters, and outputs the stream to later processing.

The parameters below are exemplifies as the first parameters and the second parameters. In particular, the parameters (first parameters) that are reused during re-encoding will be described. The syntax elements by an AVC standard that is used to recreate the initial encoding conditions are referred to as the parameters. Such parameters mainly include a macro block type (mb_type), a prediction mode (Intra4×4PredMode, Intra8×8PredMode), a quantization mode, moving vectors, and the like.

When such parameters are encoders, the parameters become candidates for parameters that are reused. Parameters relating to encoding other than such candidates may also become parameters that reused during re-encoding according to the embodiment. Further, all of the parameters exemplified here may be parameters that are reused or a portion thereof may be parameters that are reused.

The encoding unit 13 determines whether to perform encoding using the first parameters or to perform encoding without using the first parameters (normal encoding) depending on whether or not effect processing by the effect processing unit 12 has been applied. Determination of whether or not an effect influences the parameters of the encoding is therefore performed in step S14. The flag setting unit 14 performs such a determination. The flag setting unit 14 obtains information relating to the effect processing that the effect processing unit 12 applied, for example, information that telop effect processing has been applied, from the effect processing unit 12.

The flag setting unit 14 performs determination of whether or not the effect influences the parameters of the encoding from the information from the effect processing unit 12. When the information from the effect processing unit 12 indicates that effect processing has not been executed, the flag setting unit 14 determines that the effect does not influence the parameters of the encoding. Further, in a case when the information from the effect processing unit 12 has executed effect processing but is a predetermined effect, the flag setting unit 14 determines that the effect does not influence the parameters of the encoding. Here, description will be given of the predetermined effect that is determined to be an effect that does not influence the parameters of the encoding.

First, effects that do not influence the parameters of the encoding are effects in which the image quality does not deteriorate even when encoding using the first parameters is performed in the description above. As described above, when re-encoding a decoded image on which an effect is applied, while there is a possibility that the image quality deteriorates if re-encoding is performed using the first parameters, the applicants have verified that there are effects in which the image quality does not deteriorate (there is negligible deterioration in image quality) even when the first parameters are used. Color correction is an example of such effects.

Figure 3:
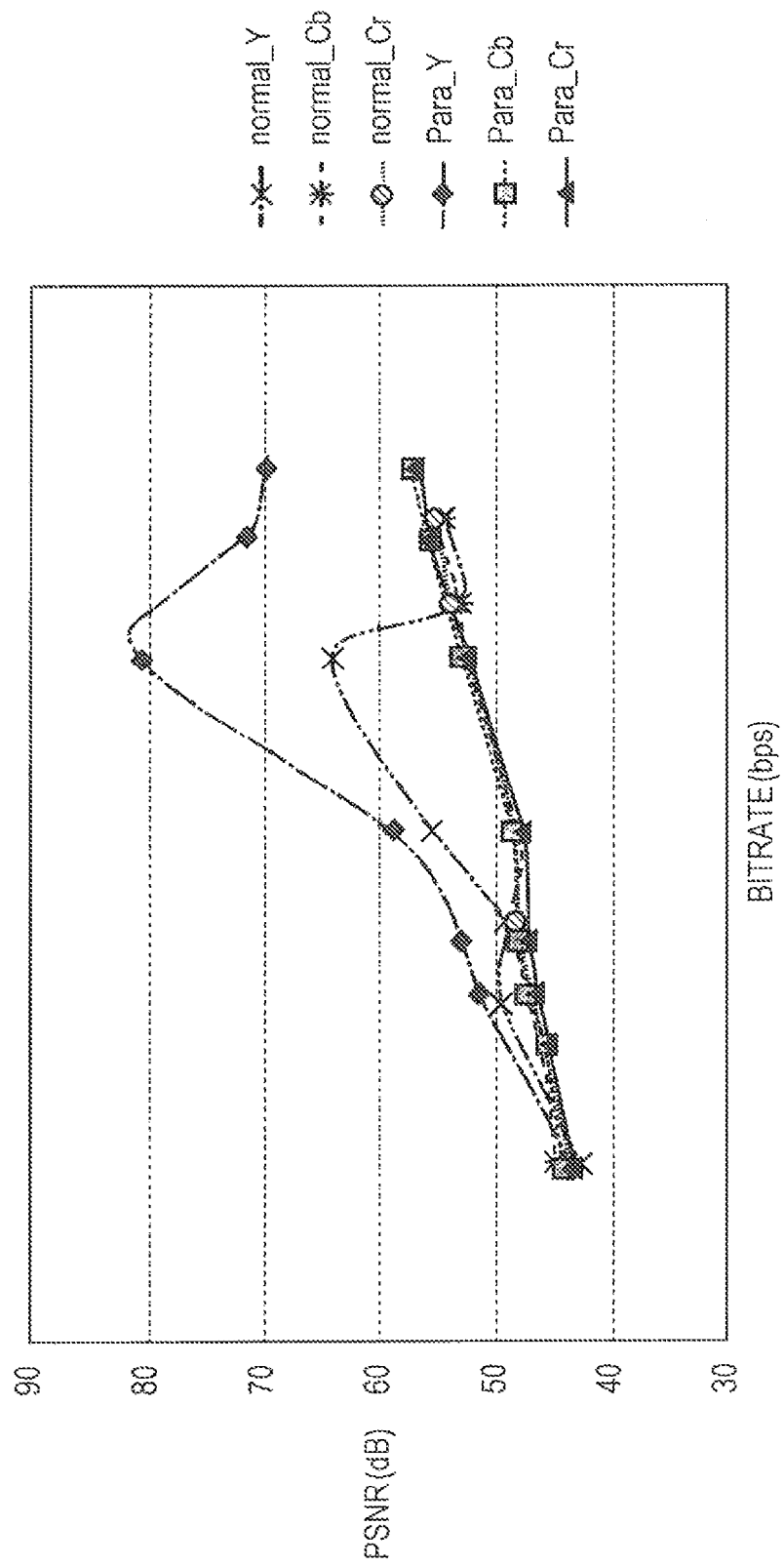
FIG. 3 is a diagram for describing the influence of effects.

The results of an experiment conducted by the applicants are illustrated in FIG. 3. The graph illustrated in FIG. 3 is of the PSNR (Peak Signal-to-Noise Ratio) of an image that is generated as below. The PSNR is one of the indices for objectively evaluating the extent of deterioration in the image after conversion, having performed compression of the image and the like.

First, the second encoded image (hereinafter referred to as the normal encoded image) is generated by decoding the first encoded image, applying a color correction effect on the decoded image, and encoding the decoded image once again by normal encoding. Furthermore, an image in which the normal encoded image is decoded (hereinafter referred to as the normal decoded image) is generated. Once the normal decoded image is generated, the PSNR of the normal decoded image and a decoded image in which the first encoded image is decoded is calculated. The PSNR is respectively calculated for a brightness signal Y, a color difference signal Cb, and a color difference signal Cr.

In FIG. 3, out of the PSNR of the decoded image in which the first encoded image is decoded and the normal decoded image, the PSNR of the brightness signal Y is expressed as Normal Y and the graph is plotted by crosses, the PSNR of the color difference signal Cb is expressed as Normal Cb and the graph is plotted by asterisks, and the PSNR of the color difference signal Cr is expressed as Normal Cr and the graph is plotted by circles.

Similarly, the second encoded image (hereinafter referred to as the para-encoded image) is generated by decoding the first encoded image, applying the same color correction effect as before on the decoded image, and encoding the decoded image once again using the first parameters. Furthermore, an image in which the para-encoded image is decoded (hereinafter referred to as the para-decoded image) is generated. Once the para-decoded image is generated, the PSNR of the para-decoded image and a decoded image in which the first encoded image is decoded is calculated. The PSNR is also respectively calculated for the brightness signal Y, the color difference signal Cb, and the color difference signal Cr.

In FIG. 3, out of the PSNR of the decoded image in which the first encoded image is decoded and the para-decoded image, the PSNR of the brightness signal Y is expressed as Para Y and the graph is plotted by diamonds, the PSNR of the color difference signal Cb is expressed as Para Cb and the graph is plotted by squares, and the PSNR of the color difference signal Cr is expressed as Para Cr and the graph is plotted by triangles.

When FIG. 3 is referenced, the graph of Normal Cb and the graph of Para Cb approximately overlap, and it is seen that the points that are plotted are overlapping. Similarly, the graph of Normal Cr and the graph of Para Cr approximately overlap, and it is seen that the points that are plotted are overlapping.

It is thereby seen that if an effect is an effect that changes the color difference signal Cb or the color difference signal Cr, images with approximately the same image quality are able to be generated whether encoding is performed using the first parameters or normal encoding is performed. Accordingly, it is seen that in the case of such an effect, when an image that is decoded and on which effect processing is applied is encoded once again, even if encoding is performed using the parameters (first parameters) that were used when encoding before the decoding are used, there are no particular problems.

Further, when FIG. 3 is referenced, the graph of Normal Y and the graph of Para Y have little overlap, and the points that are plotted are also far apart. It is thereby seen that while there may arise a case when the parameters are not easily used if the change amounts become large, in a case when the effect is an effect that changes the brightness signal Y, when an image that is decoded and on which effect processing is applied is encoded once again, re-encoding in which deterioration in the image quality is suppressed becomes possible by reusing the parameters even when encoding using the parameters used in the encoded before the decoding.

In such a manner, in the case of color correction of changing the color difference signal Cb, the color difference signal Cr, and the brightness signal Y, when considering why there is no negative influence even if encoding in which the parameters are reused is performed, it is considered that the reason is that while there are four prediction modes of the chroma, when the hue of the chroma is changed by a small amount compared to other prediction modes, it is rare that the prediction mode itself also changes.

In such a manner, there are effects with which the image quality does not deteriorate even if the parameters used during the encoding before the decoding are used during the re-encoding. Edits in which the waveform is changed such as brightness adjustment and color adjustment are effects with which the image quality does not deteriorate comparatively even when the parameters are reused, and edits in which different waveforms are used instead such as by inserting characters and images are effects with which there is a deterioration in the image quality if the parameters are reused. In a case when effects with which it is determined that there is no deterioration in the image quality are applied, the encoding unit 13 reduces the amount of time taken to encode or reduces the processing ability by encoding the decoded image from the effect processing unit 12 using the parameters that are supplied from the decoding unit 11.

Figure 2:
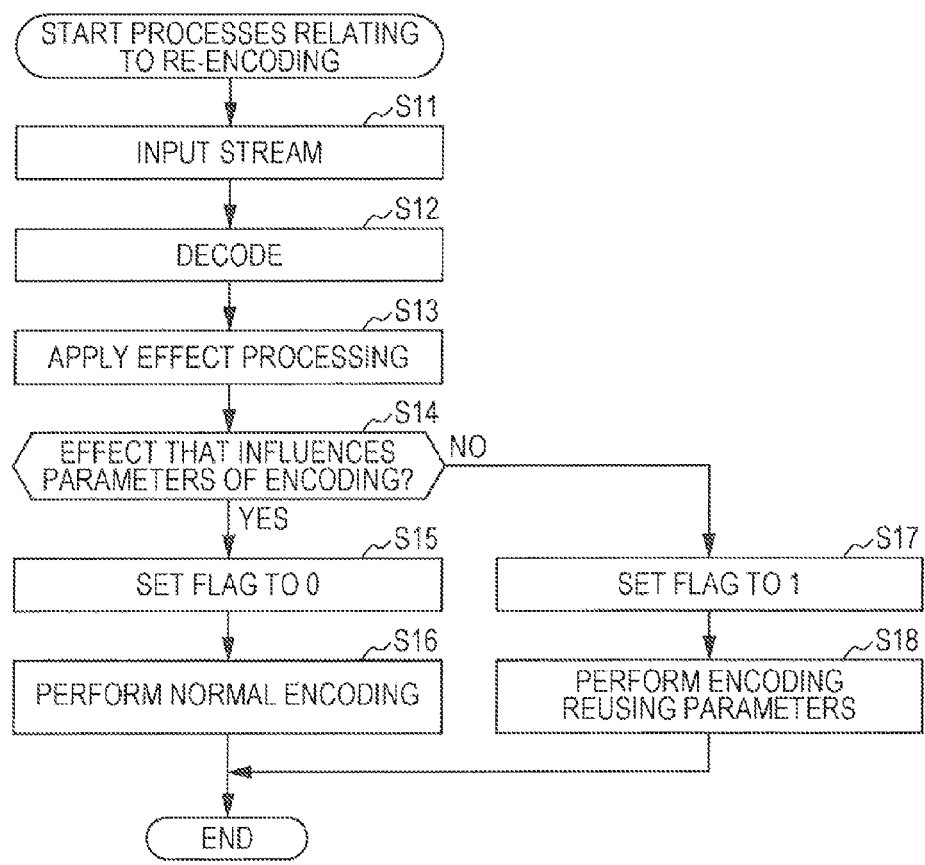
FIG. 2 is a flowchart for describing the actions of the editing machine according to the first embodiment.

Returning to the description of the flowchart of FIG. 2, determination of whether or not an effect influences the parameters of the encoding is performed in step S14. An "effect that influences the parameters of the encoding" is an effect other than effects with which it is verified that there is no negative influence even if the encoding unit 13 performs encoding using parameters that are decoded by the decoding unit 11. In other words, such an effect has the possibility that the first parameters change.

Here, although an "effect that influences the parameters of the encoding" in the descriptions given above and below is described as an effect other than the effect of color correction in which the color difference signals are changed, the effect of color correction in which the color difference signals are changed is only an example, and not to be limiting.

In step S14, the flag setting unit 14 determines what effect has been added from the information from the effect processing unit 12, and in a case when it is determined that such an effect is an effect that influences the parameters of the encoding, the process proceeds to step S15. In step S15, the flag setting unit 14 sets the flag to "0" and outputs the flag to the encoding unit 13.

In step S16, the encoding unit 13 performs an encoding process on a decoded image on which effect processing from the effect processing unit 12 is applied. At this time, in a case when the flag that is supplied from the flag setting unit 14 is "0", the encoding unit 13 performs normal encoding. That is, the encoding unit 13 performs encoding that does not use the first parameters that are supplied from the decoding unit 11. In such a manner, when an effect that influences the parameters of the encoding is applied, encoding is performed without reusing the parameters.

On the other hand, in step S14, in a case when it is determined that the effect does not influence the parameters of the encoding, the process proceeds to step S17. In step S17, the flag setting unit 14 sets the flag to "1" (raises the flag) and outputs the flag to the encoding unit 13.

In step S18, the encoding unit 13 performs an encoding process on a decoded image on which effect processing from the effect processing unit 12 is applied. At this time, in a case when the flag that is supplied from the flag setting unit 14 is "1", the encoding unit 13 performs encoding in which the parameters are reused. That is, the encoding unit 13 performs encoding using the first parameters that are supplied from the decoding unit 11. In such a manner, when an effect that does not influence the parameters of the encoding is performed, encoding is performed by reusing the parameters.

The editing process (series of processes of decoding, editing, and encoding) of the editing machine 10 is performed by such processes being repeated.

Here, although normal encoding is performed when the flag is 0 (when the flag is not raised) and encoding in which the parameters are reused is performed when the flag is 1 (when the flag is raised), normal encoding may be performed when the flag is 1 and encoding in which the parameters are reused may be performed when the flag is 0.

Further, information as to whether the flag is 0 or 1 may be included in the stream along with the second encoded image that is encoded by the encoding unit 13 and the first parameters (second parameters). By being included in the stream, in a case when further edits are made by another device or the like, it becomes possible for the information to be used in processing when specifying the locations where edits are added.

Further instead of flags, a value that identifies the effect for each effect is assigned to each effect, and such a value may be included in the stream. Furthermore, a configuration in which whether or not encoding that reuses the first parameters is performed based on the value that identifies the effect is also possible.

Further, while described later with reference to FIG. 6, since whether or not encoding that uses the parameters that are decoded during the decoding is performed is determined by whether or not the flag is raised, it is also possible to configure the editing machine 10 to have a configuration in which it is possible to switch between encoding using the decoded parameters and encoding that does not use the decoded parameters by providing a switch that switches between supplying and not supplying the decoded parameters to the encoding unit 13 and controlling such a switch.

As described above for the editing machine 10, it is also possible to shorten the time taken by the processing of the editing machine 10 and to reduce the processing ability by reusing the parameters. In the related art, since the parameters were not reused in a case when effects (edits) were applied, it was difficult to shorten the actual time taken by decoding, editing, and encoding.

If the parameters are reused for an image on which an effect is applied, the parameters become not necessarily the optimum encoding conditions due to changes in the image, and as a result, there may be a case when deterioration in the image quality occurs. Although the macro blocks (MB) that were referenced up to that point change due to image insertions by edits as one of the causes of a deterioration in the image quality, the error becomes greater by performing encoding without changing the reference, and as a result, a decoded image in which such an encoded image is decoded becomes an image in which the image quality has deteriorated.

Accordingly, processing in which the parameters are not reused was performed in a case when an effect was applied. On the other hand, according to the present technology, it is possible to reuse the parameters for effects with which there is no negative influence even if the parameters are reused, and shortening of the processing time and the like become possible.

According to the embodiment described above, the processes of the flowchart of FIG. 2 are able to be performed, for example, for every image (frame) unit. In a case when the processes are performed for every image unit, the type of effect that is applied on one decoded image is determined, and it is determined whether or not the effect is an effect that influences the first parameters (process of step S14). Furthermore, encoding using the first parameters or encoding without using the first parameters is performed.

While such a configuration is possible, a configuration in which the processes of the flowchart of FIG. 2 are executed in macro block units is also possible. In a case when the processes are performed by macro block units, the type of effect that is applied on the macro block that is the processing target is determined, and it is determined whether or not the effect is an effect that influences the first parameters (process of step S14). Furthermore, encoding using the first parameters or encoding without using the first parameters performed on an image within a region within a decoded image that is equivalent to the macro block that is the process target.

For example, in a case when an effect such as a telop is applied, the telop is not inserted over the entirety of the image but is inserted into regions of portions of the image such as the lower region or upper left and upper right regions. In other words, an effect is not applied over the entirety of the image but an effect is applied in a region of a portion of the image. In a case when an effect is applied in such a region of a portion within the image, if the flowchart of FIG. 2 is executed in macro block units, it becomes possible to perform encoding by determining more finely whether or not to perform encoding using the first parameters.

In the description given above and below, a block is not limited to a macro block, is a region of a predetermined size as the processing unit, and collectively refers to one macro block, a plurality of macro blocks, one image, and the like.

Editing Machine as Image Processing Device According to Second Embodiment

In the first embodiment, an example was described in which encoding reusing the parameters or encoding without reusing the parameters by determining whether or not an effect influences the parameters of encoding in step S14. Next, an embodiment in which encoding reusing the parameters or encoding without reusing the parameters is performed based on the change amount between an image before and after an effect is applied will be described.

Figure 4:
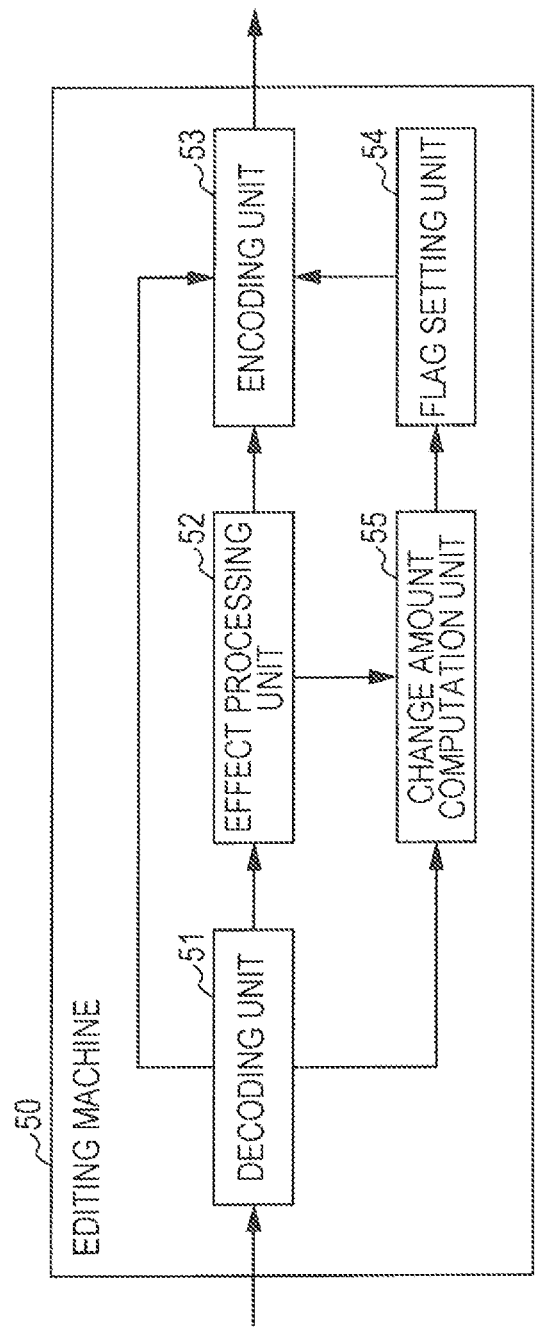
FIG. 4 is a diagram that illustrates the configuration of an editing machine according to a second embodiment.

FIG. 4 is a diagram that illustrates the configuration of an editing machine as an image processing device according to a second embodiment. An editing machine 50 illustrated in FIG. 4 is configured by a decoding unit 51, an effect processing unit 52, an encoding unit 53, a flag setting unit 54, and a change amount computation unit 55. Compared to the editing machine 10 illustrated in FIG. 1, the editing machine 50 illustrated in FIG. 4 has a configuration in which the change amount computation unit 55 is added. That is, the decoding unit 51, the effect processing unit 52, the encoding unit 53, and the flag setting unit 54 of the editing machine 50 illustrated in FIG. 4 respectively correspond to the decoding unit 11, the effect processing unit 12, the encoding unit 13, and the flag setting unit 14 of the editing machine 10 illustrated in FIG. 1. Overlapping description will therefore be omitted as appropriate.

A decoded image that is decoded by the decoding unit 51 and a decoded image on which effect processing is applied by the effect processing unit 52 (hereinafter, referred to as the effect decoded image) are supplied to the change amount computation unit 55. The change amount computation unit 55 computes the change amount of decoded image and the effect decoded image, and supplies the change amount to the flag setting unit 54. The change amount is a value that represents how much the decoded image has changed by an effect being applied to the decoded image.

The flag setting unit 54 does not raise a flag in a case when the change amount from the change amount computation unit 55 is equal to or greater than a predetermined threshold value, that is, when a change in the decoded image is represented due to an effect being applied, and the flag setting unit 54 raises a flag in a case when the change amount is not equal to or greater than a predetermined threshold value. The flag in such a case is the same as in the first embodiment, and is a flag that is raised in a case when encoding using the first parameters decoded by the decoding unit 51 is performed. In such a case, similarly to the first embodiment, a configuration in which the flag is not raised in a case when encoding using the first parameters decoded by the decoding unit 51 is performed is also possible.

Figure 5:
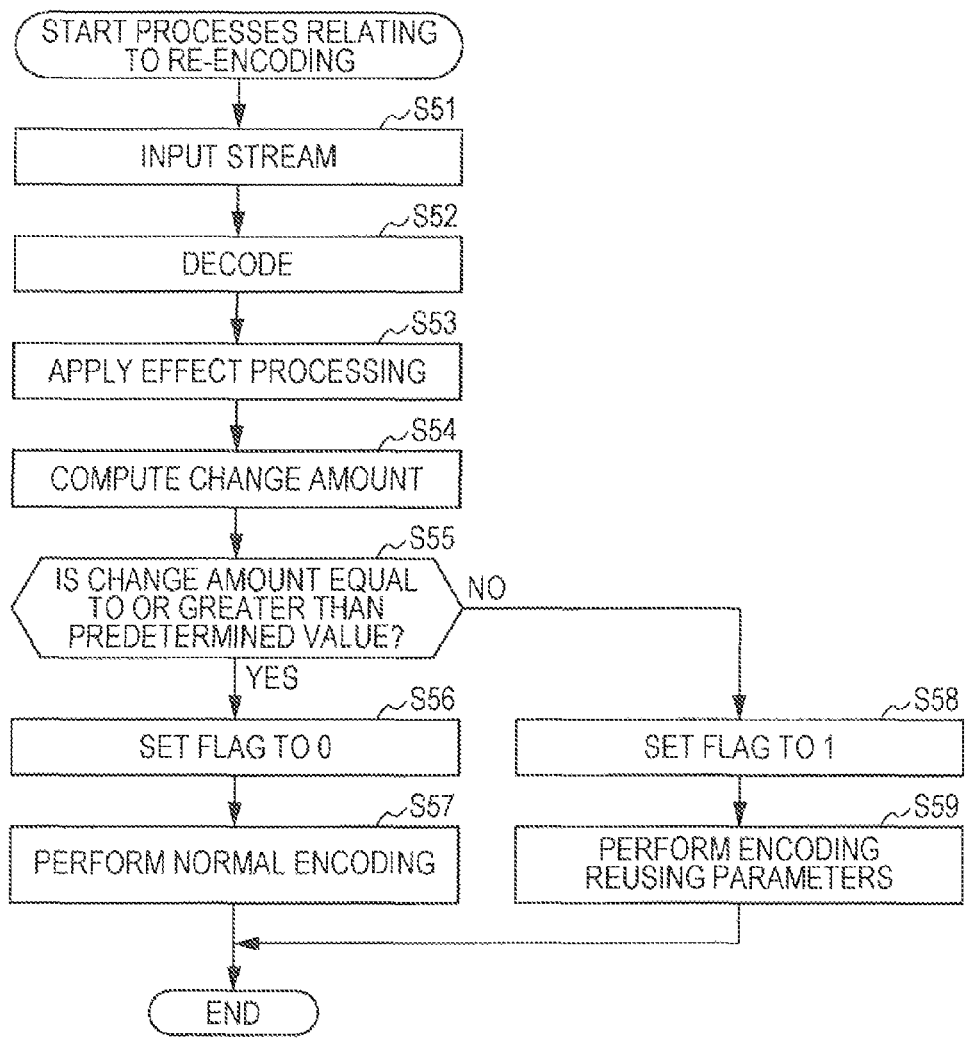
FIG. 5 is a flowchart for describing the actions of the editing machine according to the second embodiment.

The processes of the editing machine 50 illustrated in FIG. 4 will be described with reference to the flowchart illustrated in FIG. 5. The decoding unit 51 inputs the stream in step S51, and decodes the input stream and generates a decoded image and the first parameters in step S52. The effect processing unit 52 applies effect processing on the decoded image based on an instruction from the user in step S53. The processes of steps S51 to S53 are performed similarly to the processes of steps S11 to S13 of FIG. 2.

The change amount is computed in step S54. The change amount computation unit 55 computes the change amount of the decoded image that is decoded by the decoding unit 51 and the effect decoded image to which effect processing has been carried out by the effect processing unit 52. As the change amount, the change amount of the brightness values of macro blocks that are the processing targets is computed for every pixel, and the sum of the absolute values thereof is taken as the change amount.

Further, the correlation coefficient may be computed and the correlation coefficient taken as the change amount, or the distribution of change amounts may be taken as the change amount. Furthermore, the change amounts of pixels may be computed, the average value computed, and the average value taken as the change amount. In addition, the manner in which the change amount is computed may be switched according to the type of effect that is applied by the effect processing unit 52, and the change amount may be computed by computation that is suitable for the effect that is applied. The manner of computation is set at the design stage as appropriate.

In step S54, when the change amount is computed by the change amount computation unit 55, the change amount is supplied to the flag setting unit 54. In step S55, the flag setting unit 54 determines whether or not the change amount is equal to or greater than a predetermined threshold value. In a case when it is determined by the flag setting unit 54 that the change amount is equal to or greater than a predetermined threshold value, the process proceeds to step S56 and the flag is set to 0. Furthermore, in step S57, normal encoding is performed on the decoded image by the encoding unit 53.

That is, in such a case, since if encoding in which changes in the decoded image are large and reusing the parameters is performed by the effect that is added to the decoded image, there is a possibility that a deterioration occurs in the image quality, normal encoding is performed. The processes of steps S56 and S57 are performed similarly to the processes of steps S15 and S16 in FIG. 1.

On the other hand, in a case when the flag setting unit 54 determines in step S55 that the change amount is not equal to or greater than the predetermined threshold value, the process proceeds to step S58 and the flag is set to 1. Furthermore, in step S59, encoding using the first parameters is performed on the decoded image by the encoding unit 53. That is, in such a case, even if an effect is added to the decoded image, since the change to the decoded image is small, since the possibility that a deterioration occurs in the image quality is small even if encoding reusing the parameters is performed, encoding reusing the first parameters is performed. The processes of steps S58 and S59 are performed similarly to the processes of steps S17 and S18 in FIG. 1.

In such a manner, since whether or not encoding reusing the first parameters is determined by whether or not the change amount is greater than a threshold value, efficient encoding is able to be performed by setting the threshold value appropriately. For example, it is verified in advance that the image quality does not deteriorate when encoding reusing the first parameters is performed even if there is a change in the decoded image as long as the change amount is within a certain degree, and the threshold value is set based on such a verification result.

By using such a threshold value, it becomes possible to perform encoding using the first parameters in a case when an effect that is applied on a decoded image is weak and there is no deterioration in the image quality even when encoding is performed using the first parameters.

Editing Machine as Image Processing Device According to Third Embodiment

According to the second embodiment, an embodiment was described in which it is determined whether or not to raise a flag based on the change amount of an image before and after an effect is applied and encoding reusing the parameters or encoding without reusing the parameters is performed according to the state of the flag. An embodiment in which whether or not to supply the first parameter to the encoding unit 53 is switched using a switch instead of the flag of the second embodiment will be described below as a third embodiment.

Figure 6:
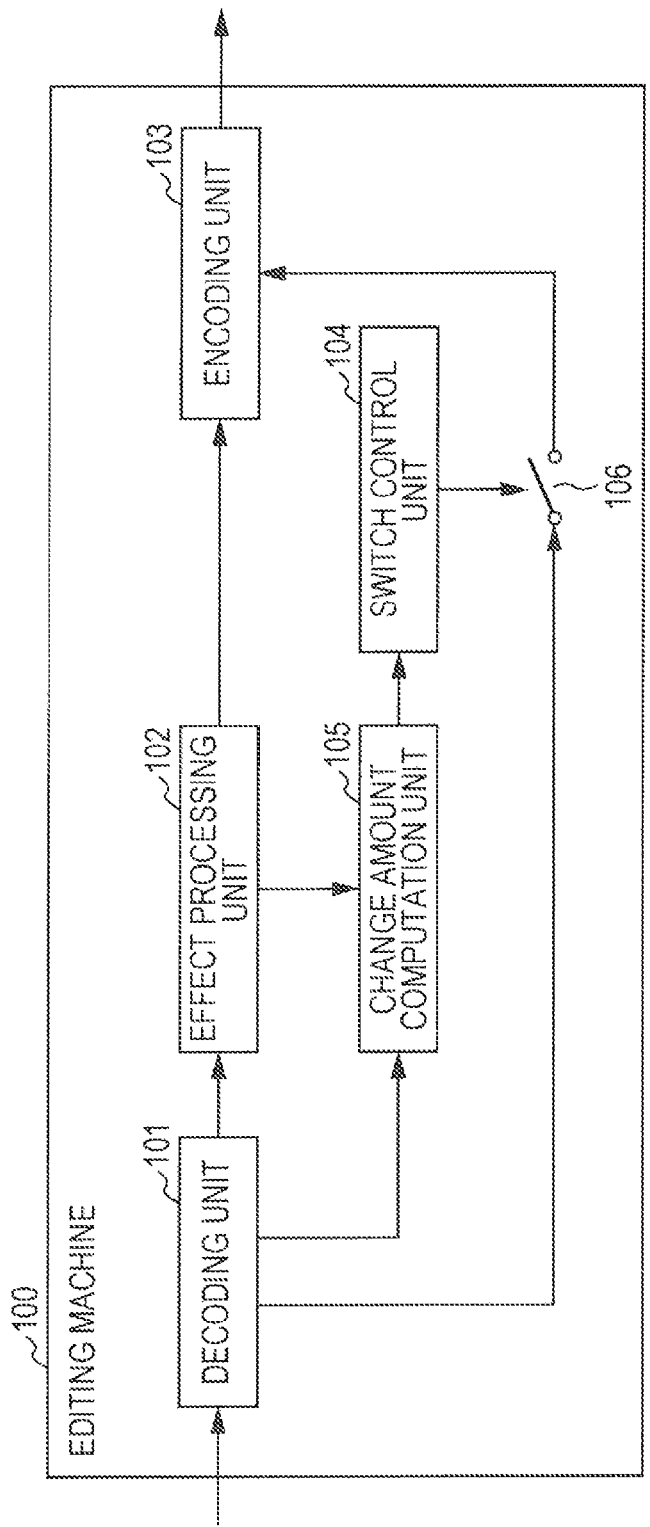
FIG. 6 is a diagram that illustrates the configuration of an editing machine according to a third embodiment.

FIG. 6 is a diagram that illustrates the configuration of an editing machine as an image processing device according to the third embodiment. An editing machine 100 illustrated in FIG. 6 is configured by a decoding unit 101, an effect processing unit 102, an encoding unit 103, a switch control unit 104, a change amount computation unit 105, and a switch 106. Compared to the editing machine 50 illustrated in FIG. 4, the editing machine 100 illustrated in FIG. 6 has a configuration in which the switch control unit 104 and the switch 106 are added instead of the flag setting unit 54. That is, the decoding unit 101, the effect processing unit 102, the encoding unit 103, and the change amount computation unit 105 of the editing machine 100 illustrated in FIG. 6 respectively correspond to the decoding unit 51, the effect processing unit 52, the encoding unit 53, and the change amount computation unit 55 of the editing machine 50 illustrated in FIG. 4. Overlapping description will therefore be omitted as appropriate.

In a case when the change amount from the change amount computation unit 105 is equal to or greater than a predetermined threshold value, that is, in a case when it is shown that the decoded image has changed due to an effect being applied, the switch control unit 104 performs control to open the switch 106. Further, in a case when the change amount from the change amount computation unit 105 is within a predetermined threshold value, that is, in a case when it is shown that an effect has not been applied or even if an effect has been applied, the decoded image has not changed much, the switch control unit 104 performs control for closing the switch 106.

One end of the switch 106 is connected to the decoding unit 101, and the other end is connected to the encoding unit 103. The configuration is such that the first parameters decoded by the decoding unit 101 are supplied to the encoding unit 103 by the switch 106 being closed. The encoding unit 103 is configured to execute encoding using the supplied first parameters when the first parameters are supplied and to execute normal encoding when the first parameters are not supplied.

Here, although a diagram that imagines a physical switch has been illustrated in FIG. 6, the configuration of the switch 106 is not limited to the configuration illustrated in FIG. 6, and it is sufficient if there is a function of switching whether or not to supply the parameters from the decoding unit 101 to the encoding unit 103. Further, it is also sufficient if the switch control unit 104 has a function of controlling such switching.

Figure 7:
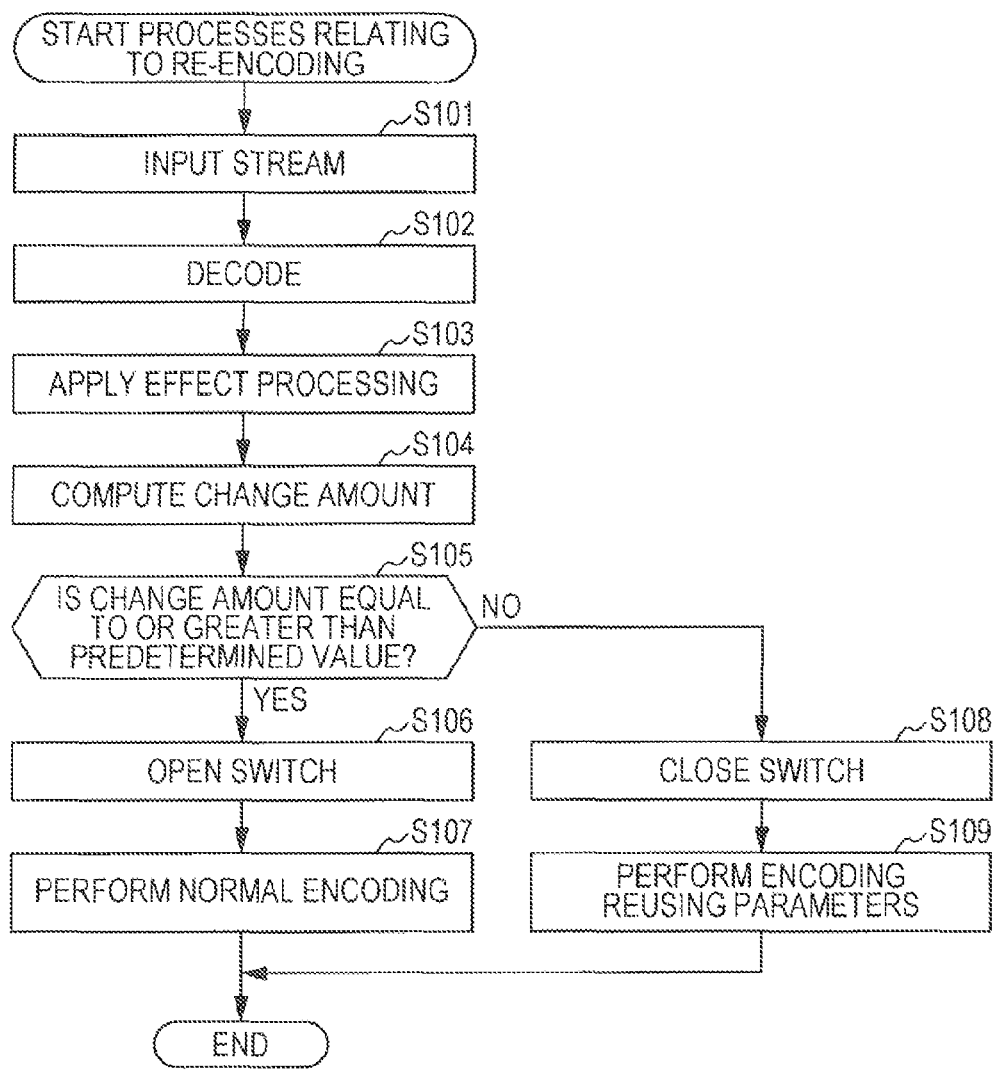
FIG. 7 is a flowchart for describing the actions of the editing machine according to the third embodiment.

The processes of the editing machine 100 illustrated in FIG. 6 will be described with reference to the flowchart illustrated in FIG. 7. The decoding unit 101 inputs a stream in step S101 and in step S102, the input stream is decoded and the decoded image and the first parameters are generated. The effect processing unit 102 applies effect processing on the decoded image in step S103 based on an instruction from the user. Furthermore, in step S104, the change amount computation unit 105 computes the change amount of the decoded image that is decoded by the decoding unit 101 and the effect decoded image on which the effect processing is applied by the effect processing unit 102.

When the change amount is computed by the change amount computation unit 105, the change amount is supplied to the switch control unit 104. The switch control unit 104 determines in step S105 whether or not the change amount is equal to or greater than a predetermined value. In a case when it is determined by the switch control unit 104 that the change amount is equal to or greater than the predetermined threshold value, the process proceeds to step S106. The processes of steps S101 to S105 are performed similarly to the processes of steps S51 to S55 of FIG. 5.

The switch control unit 104 performs control to open to switch 106 in step S106. When the switch 106 is in an opened state, the switch control unit 104 performs control to maintain such a state, and when the switch 106 is in a closed state, the switch control unit 104 performs control to open the switch 106. By the switch 106 being opened, a state occurs in which the first parameters that are decoded by the decoding unit 101 are not supplied to the encoding unit 103.

That is, in such a case, since if encoding in which changes in the decoded image are large and reusing the parameters is performed by the effect that is added to the decoded image, there is a possibility that a deterioration occurs in the image quality, a state occurs in which the first parameters are not supplied, and normal encoding is performed by the encoding unit 103. The process of step S107 is performed similarly to the process of step S16 in FIG. 1.

On the other hand, in a case when the switch control unit 104 determines in step S105 that the change amount is not equal to or greater than a predetermined threshold value, the process proceeds to step S108. The switch control unit 104 performs control to close the switch 106 in step S108. When the switch 106 is in a closed state, the switch control unit 104 performs control to maintain such a state, and when the switch 106 is in an opened state, the switch control unit 104 performs control to close the switch 106. By the switch 106 being closed, a state occurs in which the first parameters that are decoded by the decoding unit 101 are supplied to the encoding unit 103.

In step S109, encoding reusing the first parameters is performed on the decoded image by the encoding unit 103. That is, in such a case, even if an effect is added to the decoded image, since the change to the decoded image is small, since the possibility that a deterioration occurs in the image quality is small even if encoding reusing the parameters is performed, encoding reusing the first parameters is performed. The process of step S109 is performed similarly to the process of step S18 in FIG. 1.

In such a manner, since whether or not encoding reusing the first parameters is determined by whether or not the change amount is greater than a threshold value, efficient encoding is able to be performed by setting the threshold value appropriately.

Although not shown, it is also possible to make the configuration of the editing machine 10 illustrated in FIG. 1 a configuration in which the switch control unit 104 and the switch 106 are provided instead of the flag setting unit 14. The configuration is such that the information relating to the effect from the effect processing unit 12 is supplied to the switch control unit 104, one end of the switch 106 is Connected to the decoding unit 11, and the other end is connected to the encoding unit 13. Further, with such a configuration, the switch control unit 104 is configured to determine whether or not an effect that influences the parameters of the encoding is applied, and controls to close the switch 106 only when it is determined that such an effect has not been applied.

Editing Machine as Image Processing Device According to Fourth Embodiment

According to the second and third embodiments, embodiments were described in which it is determined whether or not to raise a flag or whether or not to close a switch based on the change amount of an image before and after an effect is applied and encoding reusing the parameters or encoding without reusing the parameters is performed according to the state of the flag or the switch. A fourth embodiment described below is an embodiment in which in addition to the processes described above, it is further determined whether or not there is a change to the referenced image and it is determined whether or not encoding reusing the parameters is to be performed.

Figure 8:
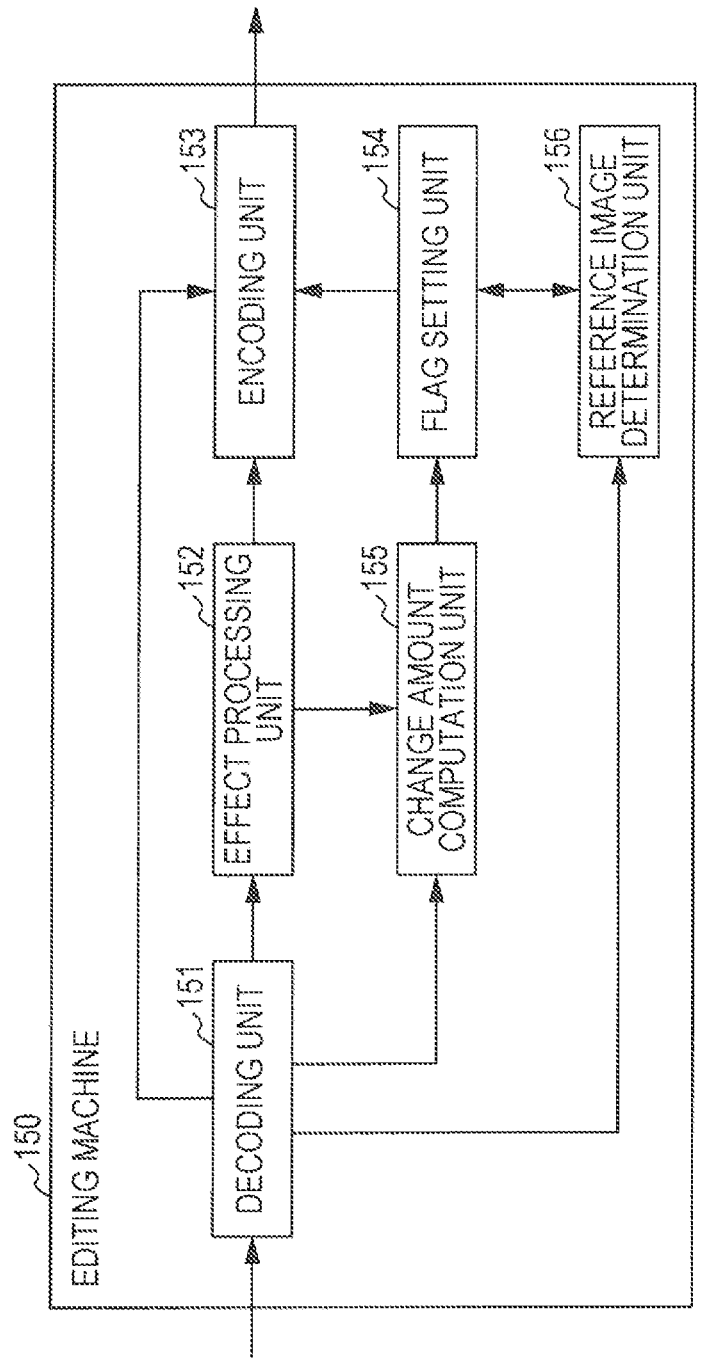
FIG. 8 is a diagram that illustrates the configuration of an editing machine according to a fourth embodiment.

FIG. 8 is a diagram that illustrates the configuration of an editing machine as an image processing device according to the fourth embodiment. An editing machine 150 illustrated in FIG. 8 is configured by a decoding unit 151, an effect processing unit 152, an encoding unit 153, a flag setting unit 154, a change amount computation unit 155, and a reference image determination unit 156. Compared to the editing machine 50 illustrated in FIG. 4, the editing machine 150 illustrated in FIG. 8 has a configuration in which the reference image determination unit 156 is added. That is, the decoding unit 151, the effect processing unit 152, the encoding unit 153, the flag setting unit 154, and the change amount computation unit 155 of the editing machine 150 illustrated in FIG. 8 respectively correspond to the decoding unit 51, the effect processing unit 52, the encoding unit 53, the flag setting unit 54, and the change amount computation unit 55 of the editing machine. 50 illustrated in FIG. 4. Overlapping description will therefore be omitted as appropriate.

The reference image determination unit 156 determines whether or not there is a change to a block that a block that is the processing target references during encoding, and supplied the determination result to the flag setting unit 154. The reference image determination unit 156 includes a function of storing an image that an image that is the processing target references in order to perform such a determination, and includes a function of inputting and temporarily storing the decoded image from the decoding unit 151. Further, as described above, the reference image determination unit 156 includes a function of storing information from the flag setting unit 154 as information for determining whether or not there is a change to the image that the image that is the processing target references.

The flag setting unit 154 does not raise a flag in a case when the change amount from the change amount computation unit 155 is equal to or greater than a predetermined threshold value. Further, the flag setting unit 154 raises a flag in a case when the change amount from the change amount computation unit 155 is not equal to or greater than the predetermined threshold value and when the determination result from the reference image determination 156 is a result that there is also no change to the block that the block that is the processing target references. Similarly to the first and second embodiments, the flag in such a case is a flag that is raised in a case when encoding is performed using the first parameters decoded by the decoding unit 151. In such a case, similarly to the first embodiment, a configuration in which the flag is not easily raised in a case when encoding using the first parameters decoded by the decoding unit 151 is performed is also possible.

Here, the determination that the reference image determination unit 156 performs will be described with reference to FIG. 9. In-frame prediction and inter-frame prediction are performed with an encoding method such as the MPEG method. In-frame prediction is prediction that uses the fact that the correlation between adjacent pixels within one image (frame) is high, and inter-frame prediction is prediction that uses the correlation between frames. FIG. 9A is a diagram for describing the reference relationship of in-frame prediction and FIG. 9B is a diagram for describing the reference relationship of inter-frame prediction.

In FIG. 9A, a block A is a block on which an edit (effect) has been applied. A block B references the block A during encoding. Further, a block C references the block B during encoding. Similarly, in FIG. 9B, the block A is a block on which an edit (effect) has been applied. The block B references the block A during encoding. Further, the block C references the block B during encoding.

Figure 9B:
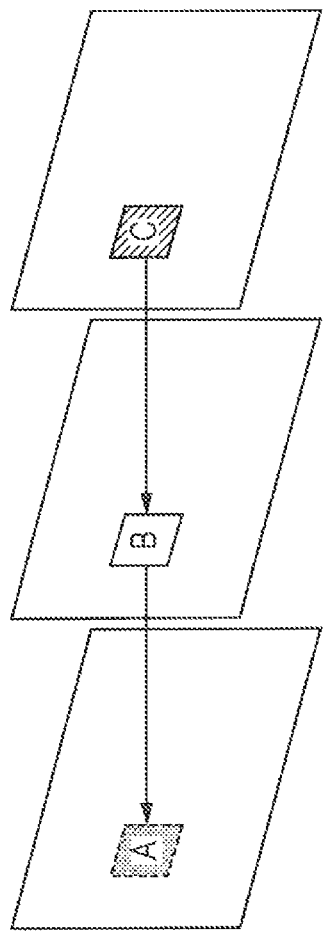
FIGS. 9A and 9B are diagrams for describing a reference image.
Figure 9A:
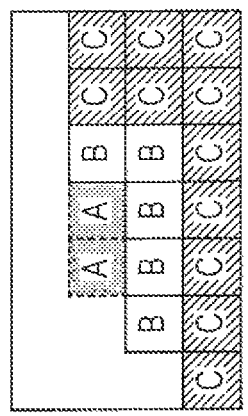

The reference relationships illustrated in FIGS. 9A and 9B are examples, and since the block that is referenced is different depending on the prediction mode and the like, such reference relationships are not limited to the reference relationship illustrated in FIG. 9A. Further, the reference image is the image that the block that is the processing target references, and the image that is referenced may be a block of a similar size to the block that is the processing target, or may be a block of a different size.

Since an effect is applied on the block A, re-encoding using decoded parameters is not performed. With the block B, even in a case when an effect is not applied on the block B itself, re-encoding using decoded parameters is not performed. In such a case, since the block A is changed, the parameters themselves that are calculated by referencing such a block A are also likely to change. Even if re-encoding using decoded parameters is performed on the block B that references the block A, there is a possibility that the block is encoded with a large error by parameters for a block with a small error before the effect, and there is a concern that the a deterioration in the image quality occurs as a result. Accordingly, re-encoding using decoded parameters is not performed on the block B, and normal encoding is performed.

Although the block C is encoded referencing the block B, if an effect is not applied on the block B, in other words, if there is no change to the block 2, there is little possibility of the parameters themselves that are calculated by referencing such a block B changing. Accordingly, re-encoding using decoded parameters is performed on the block C.

Figure 10:
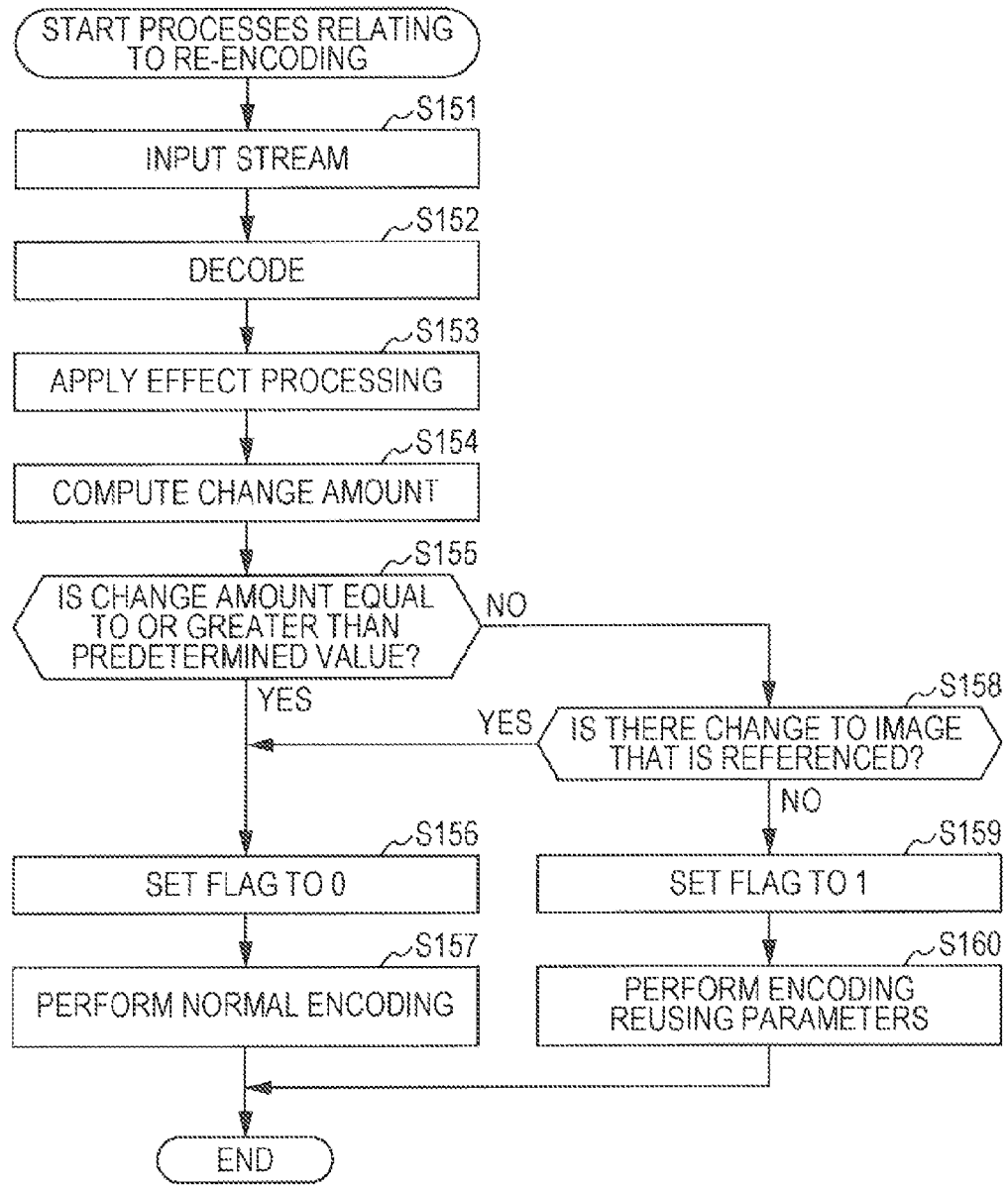
FIG. 10 is a flowchart for describing the actions of the editing machine according to the fourth embodiment.

Next, the processes of the editing machine 150 (FIG. 8) that performs such encoding will be described with reference to the flowchart of FIG. 10. The decoding unit 151 inputs a stream in step S151, and the input stream is decoded and the decoded image and the first parameters are generated in step S152. The effect processing unit 152 applied effect processing on the decoded image based on an instruction from the user in step S153. Furthermore, in step S154, the change amount computation unit 155 computes the change amount of the decoded image that is decoded by the decoding unit 151 and the effect decoded image on which effect processing is applied by the effect processing unit 152.

Once the change amount is computed by the change amount computation unit 155, the change-amount is supplied to the flag setting unit 154. The flag setting unit 154 determines in step S155 whether or not the change amount is equal to or greater than a predetermined threshold amount. In a case when the change amount is determined by the flag setting unit 154 to be equal to or greater than the predetermined threshold amount, the process proceeds to step S156. The flag setting unit 154 sets the flag to 0 in step S156. Furthermore, normal encoding is performed on the decoded image by the encoding unit 153 in step S157. The processes of steps S151 to S157 are performed similarly to the processes of steps S51 to S57 of FIG. 5.

That is, in such a case, since if encoding in which changes in the decoded image are large and reusing the parameters is performed by the effect that is added to the decoded image, there is a possibility that a deterioration occurs in the image quality, normal encoding is performed. The processes flowing from step S151 to step S157 are processes that are performed when the block A is the processing target in FIGS. 9A and 9B.

On the other hand, in a case when the flag setting unit 154 determines in step S155 that the change amount is not equal to or greater than the predetermined threshold amount, the process proceeds to step S158. It is determined in step S158 whether or not there is a change in the image that is referenced. When the flag setting unit 154 determines that the change amount is not equal to or greater than the predetermined threshold value, the reference image determination unit 156 supplies the determination result of whether or not there is a change to the reference image. The reference image determination unit 156 checks the block that the block that is the processing target references during encoding (block that is referenced during in-frame prediction, block that is referenced during inter-frame prediction) and determines whether or there is a change to the block.

In such a manner, since it is also important for the reference image determination unit 156 to have information on blocks other than the block that is the processing target, the reference image determination unit 156 includes a function of storing such information. For example, the reference image determination unit 156 stores information of the block for which the flag is raised by the flag setting unit 154. In such a case, the block for which the flag is raised is a block for which it is determined that the change amount is not equal to or greater than the predetermined value. Accordingly, the block that references the block for which the flag is raised is able to be determined as a block for which there is no change to the image that is referenced.

In a case when it is determined in step S158 that there is a change in the image (block) that the block that is the processing target references, the process proceeds to step S156. Such a flow of processes is, for example, the flow of processes when the block B of FIGS. 9A and 9B is the processing target. That is, since an effect is not applied on the block B itself, although it is determined in step S155 that the change amount is not equal to or greater than the predetermined value, since the block A is referenced, it is determined in step S158 that there is a change to the image that is referenced (block A), and the process proceeds to step S156.

Since the flag is set to 0 in step S156, normal encoding is performed in step S157. In such a manner, even in a case when there is no change to the block itself that is the processing target, in a case when there is a change to the block that is referenced, normal encoding is performed.

On the other hand, in a case when it is determined in step S158 that there is no change to the image (block) that the block that is the processing target references, the process proceeds to step S159. Such a flow of processes is, for example, the flow of processes when the block C of FIGS. 9A and 9B is the processing target. That is, since an effect is not applied on the block C itself, although it is determined in step S155 that the change amount is not equal to or greater than the predetermined value, since the block B is referenced, it is determined in step S158 that there is a change to the image that is referenced (block B), and the process proceeds to step S159.

The determination result of step S158 is supplied from the reference image determination unit 156 to the flag setting unit 154. The flag setting unit 154 sets the flag to 1 in step S159 based on the determination result from the reference image determination unit 156. Furthermore, encoding using the first parameters is performed by the encoding unit 153 on the decoded image in step S160. That is, in such a case, even if an effect is added to the decoded image, since the change in the decoded image is small and further since the change in the image that is referenced is also small, even if encoding reusing the parameters is performed, since the possibility that a deterioration in the image quality occurs is small, it is possible to perform encoding reusing the first parameters.

In such a manner, since whether or not encoding reusing the first parameters is to be performed is determined by whether or not the change amount is greater than a threshold amount and whether or not there is a change in the image that is referenced, it is possible to perform efficient and appropriate encoding.

Editing Machine as Image Processing Device According to Fifth Embodiment

An embodiment in which parameters other than in the quantization step (quantization parameters) are reused as are when reusing and the values of the quantization step are changed according to the image that is the processing target even when reusing will be described below.

Figure 11:
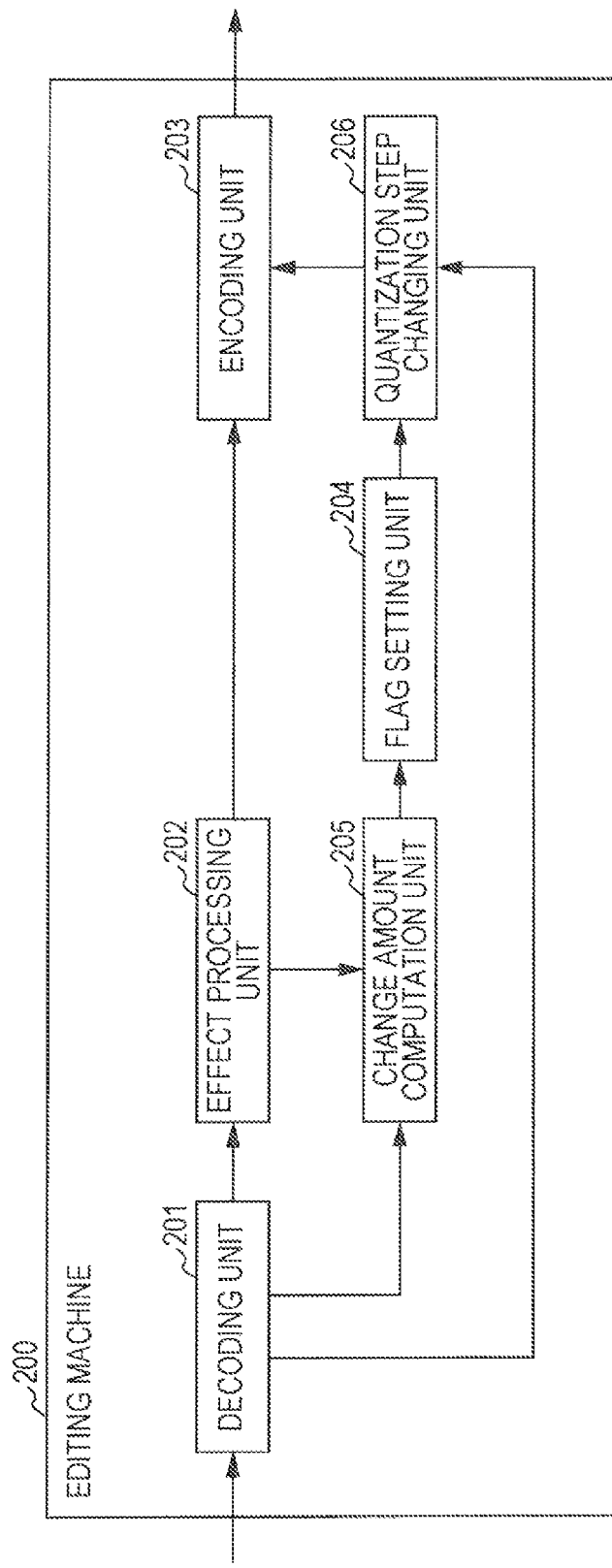
FIG. 11 is a diagram that illustrates the configuration of an editing machine according to a fifth embodiment.

FIG. 11 is a diagram that illustrates the configuration of an editing machine as an image processing device according to a fifth embodiment. An editing machine 200 illustrated in FIG. 11 is configured by a decoding unit 201, an effect processing unit 202, an encoding unit 203, a flag setting unit 204, a change amount computation unit 205, and a quantization step changing unit 206.

Compared to the editing machine 50 illustrated in FIG. 4, the editing machine 200 illustrated in FIG. 11 has a configuration in which the quantization step changing unit 206 is added. That is, the encoding unit 201, the effect processing unit 202, the encoding unit 203, the flag setting unit 204, and the change amount computation unit 205 of the editing machine 200 illustrated in FIG. 11 respectively correspond to the decoding unit 51, the effect processing unit 52, the encoding unit 53, the flag setting unit 54, and the change amount computation unit 155 of the editing machine 50 illustrated in FIG. 4. Accordingly, overlapping description will be omitted as appropriate.

The quantization step changing unit 206 has a configuration in which the parameters that are decoded by the decoding unit 201 are supplied. Further, the flag that is set by the flag setting unit 204 is also supplied to the quantization step changing unit 206. In a case when the flag from the flag setting unit 204 represents that the parameters are reused during re-encoding, the quantization step changing unit 206 changes the parameters relating to the quantization step out of the parameters to a value according to the image and supplies the value to the encoding unit 203.

Figure 12:
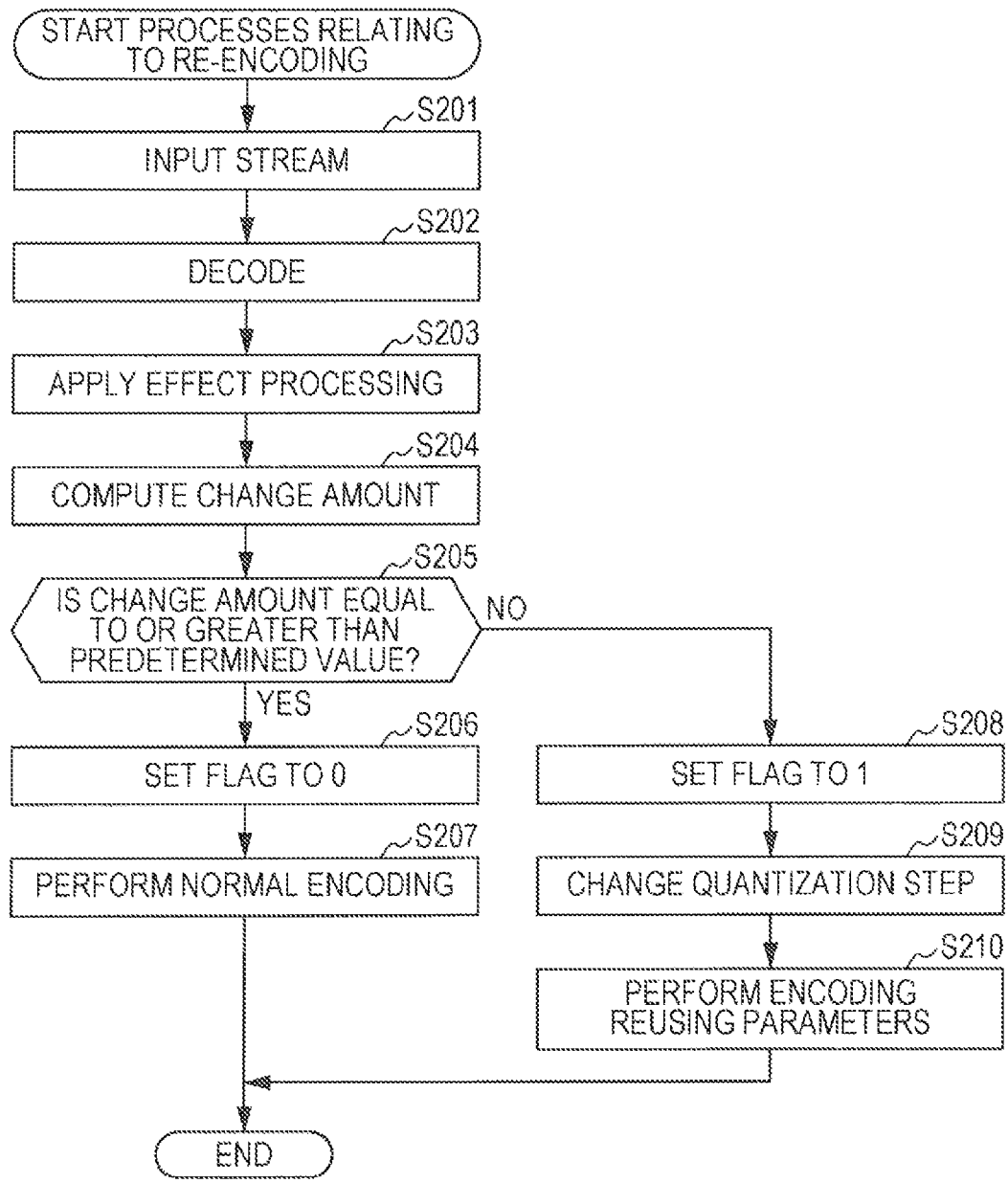
FIG. 12 it a flowchart for describing the actions of the fifth embodiment.

Next, the processes of the editing machine 200 (FIG. 11) that performs such encoding will be described with reference to the flowchart of FIG. 12. The decoding unit 201 inputs a stream in step S201, and the input stream is decoded and the decoded image and the first parameters are generated in step S202. The effect processing unit 202 applied effect processing on the decoded image based on an instruction from the user in step S203. Furthermore, in step S204, the change amount computation unit 205 computes the change amount of the decoded image that is decoded by the decoding unit 201 and the effect decoded image on which effect processing is applied by the effect processing unit 202.

Once the change amount is computed by the change amount computation unit 205, the change amount is supplied to the flag setting unit 204. The flag setting unit 204 determines in step S205 whether or not the change amount is equal to or greater than a predetermined threshold amount. In a case when the change amount is determined by the flag setting unit 204 to be equal to or greater than the predetermined threshold amount, the process proceeds to step S206. The flag setting unit 204 sets the flag to 0 in step S206. Furthermore, normal encoding is performed on the decoded image by the encoding unit 203 in step S207. The processes of steps S201 to S207 are performed similarly to the processes of steps S51 to S57 of FIG. 5.

That is, in such a case, since if encoding in which changes in the decoded image are large and reusing the parameters is performed by the effect that is added to the decoded image, there is a possibility that a deterioration occurs in the image quality, normal encoding is performed.

On the other hand, in a case when the flag setting unit 204 determines in step S205 that the change amount is not equal to or greater than the predetermined threshold amount, the process proceeds to step S208. The flag setting unit 204 sets the flag to 1 in step S208. Furthermore, the quantization step is changed in step S209. The quantization step changing unit 206 sets a quantization step that is suited to the change amount that is computed by the change amount computation unit 205.

The change amount computation unit 205 therefore computes the change amount as below. Out of the effects, in particular with regard to brightness adjustment using gamma conversion, the change amount is calculated based on the following formula.

$$\text{Change amount} = DR(\text{maximum value} - \text{minimum value}) \text{ of difference image of decoded image and edited image}$$

That is, with the change amount, the difference between the decoded image and the effect decoded image is calculated, the difference between the maximum value and the minimum value of such a difference value is further computed, and the difference value between the maximum value and the minimum value becomes the change amount.

The change amount is supplied to the quantization step changing unit 208 via the flag setting unit 204. Here, a configuration in which the change amount is directly supplied from the change amount computation unit 205 to the quantization step changing unit 206 is also possible. Further, a configuration in which the change amount from the change amount computation unit 205 is supplied to the quantization step changing unit 206 only when the flag is set to 1 by the flag setting unit 204 is also possible.

The quantization step changing unit 206 extracts the quantization step that is included in the first parameters that are supplied from the decoding unit 201, and changes the value thereof to a value that is changed by the change amount that is supplied, in this case, by a change amount that is set by the value of the DR. An example of the relationship between the DR and the change amount is shown below.

| DR | Change Amount |
|---|---|
| ≥256: | −4 |
| ≥192: | −3 |
| ≥128: | −2 |
| ≥64: | −1 |

In a case when the relationship shown above is set, for example, in a case when the DR is equal to or greater than 64 and less than 128, the quantization step is changed to a value in which 1 is subtracted. Similarly, in a case when the DR is equal to or greater than 128 and less than 192, the quantization step is change to a value in which 2 is subtracted, in a case when the DR is equal to or greater than 192 and less than 256, the quantization step is changed to a value in which 3 is subtracted, and in a case when the DR is equal to or greater than 256, the quantization step is changed to a value in which 4 is subtracted. However, there is a limit to not exceed the lower limit of the quantization step after the change. Here, a value that is smaller than the predetermined threshold value used in the determination of the flag setting unit 154 is the upper limit of the value of the DR.

Such a relationship is an example, and is not to be limiting. In such a manner, changing the quantization step by the value of the DR is so that portions with edges due to an edit being applied are prevented from becoming an image that is out of focus for which the high pass components of the original quantization step fall.

Further, conversely, while an image may become out of focus by an edit being applied, since the high pass components disappear with such a change, there is no problem even when the quantization step is lowered. Furthermore, in a case when there are no blocks for which the DR of the difference image is equal to or greater than 64, the change is equivalent to a process of not changing the quantization step.

In such a manner, in a case when the flag is set to 1, the value of the quantization step is changed by a change amount based on the value of the DR (value of the change amount). Furthermore, in step S210, encoding is performed by the encoding unit 203 using the changed quantization step and the first parameters other than the quantization step.

In such a manner, since whether or not encoding reusing the first parameters is to be performed is determined by whether or not the change amount is greater than the threshold value, efficient encoding is able to be performed. Further, when encoding reusing the first parameters is performed, since the value of the quantization step is changed to a value that is suited to the edited image, by reusing the first parameters, it is possible to prevent the image quality from deteriorating.

[Recording Medium]

The series of processes described above is able to be executed by software or hardware. In a case when the series of processes is executed by software, a program that configures the software is installed on a computer. Here, the computer includes computers that are built into dedicated hardware, general-purpose personal computers that are able to execute various functions by installing various programs, and the like.

Figure 13:
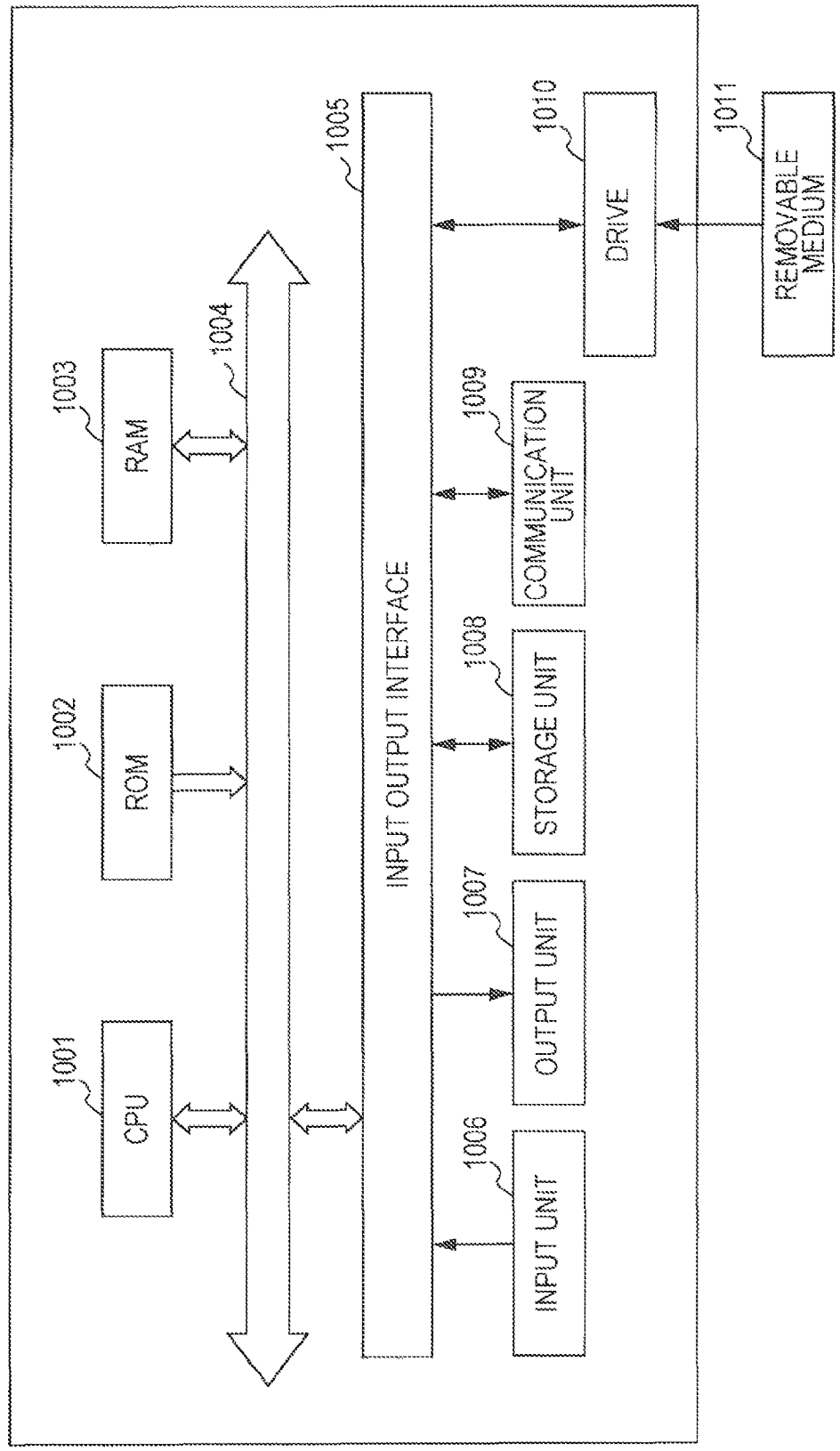
FIG. 13 is a diagram for describing a recording medium.

FIG. 13 is a block diagram that illustrates a configuration example of hardware of a computer that executes the series of processes described above by a program. In the computer, a CPU (Central Processing Unit) 1001, a ROM (Read Only Memory) 1002, and a RAM (Random Access Memory) 1003 are connected to one another by a bus 1004. An input output interface 1005 is further connected to the bus 1004. An input unit 1006, an output unit 1007, a storage unit 1008, a communication unit 1009, and a drive 1010 are connected to the input output interface 1005.

The input unit 1006 is composed of a keyboard, a mouse, a microphone, and the like. The output unit 1007 is composed of a display, a speaker, and the like. The storage unit 1008 is composed of a hard disk, a non-volatile memory, and the like. The communication unit 1009 is composed of a network interface and the like. The driver 1010 drives a removable medium 1011 such as a magnetic disk, an optical disc, an optical magnetic disc, or a semiconductor memory.

With a computer that is configured as above, the series of processes described above is performed by the CPU 1001 executing the program stored in the storage unit 1008, for example, by loading the program on the RAM 1003 via the input output interface 1005 and the bus 1004.

The program that the computer (CPU 1001) executes is able to be provided, for example, by being recorded on the removable medium 1011 as a package medium or the like. Further, the program is able to be provided via a wired or wireless transmission medium such as a local area network, the Internet, or digital satellite broadcasting.

With the computer, by equipping the removable medium 1011 on the drive 1010, the program is able to be installed in the storage unit 1008 via the input output interface 1005. Further, the program is able to be received by the communication unit 1009 via a wired or wireless transmission medium and installed on the storage unit 1008. Otherwise, the program is able to be installed in advance in the ROM 1002 or the storage unit 1008.

Here, the program that the computer executes may be a program with which processes are performed in a time series manner along the order described in the specification, or may be a program with which processes are performed at specific timings such as in parallel or when a request is made.

Further, in the specification, a system represents the entirety of a device that is configured by a plurality of devices.

Here, the embodiments of the present disclosure are not limited to the embodiments described above, and various modifications are possible without departing from the scope of the present disclosure.

The present disclosure contains subject matter related to that disclosed in Japanese Priority Patent Application JP 2011-064050 filed in the Japan Patent Office on Mar. 23, 2011, the entire contents of which are hereby incorporated by reference.

What is claimed is:

1. An image processing device comprising:
    a decoding unit that decodes compressed image data that is an encoded image and generates a decoded image that is decoded and parameters that relate to encoding which are calculated during encoding;
    an image processing unit that applies image processing including at least a color adjustment process on the decoded image;
    a controllable encoding unit that encodes the decoded image; and
    a control unit that determines whether or not the color adjustment process has been applied on the decoded image by the image processing unit, and controls the encoding unit to encode the decoded image according to a change amount representing a sum of magnitude of change for each pixel in the decoded image caused by the color adjustment process, the control unit including a change amount computation unit that changes the manner in which the change amount is computed in accordance with the image processing being applied by the image processing unit, such that the encoding unit is controlled to (a) execute encoding not using the parameters when it is determined that the change amount is equal to or greater than a predetermined threshold and (b) execute encoding using the parameters when it is determined that the change amount is less than the predetermined threshold.

2. The image processing device according to claim 1, further comprising:
a change amount computation unit that computes the change amount of the decoded image that is decoded by the decoding unit which changes by image processing being applied by the image processing unit,
wherein the control unit controls processing of the encoding unit based on whether or not the change amount is equal to or greater than a predetermined threshold value.

3. The image processing device according to claim 2, further comprising:
a switching unit that switches whether or not the parameters that are decoded by the decoding unit are supplied to the encoding unit,
wherein the control unit controls the switching unit based on whether or not the change amount is equal to or greater than a predetermined threshold value.

4. The image processing device according to claim 2, further comprising:
a reference image determination unit that determines whether or not there are changes to a reference image that is referenced when an image that is a processing target of encoding by the encoding unit is encoded,
wherein the control unit controls processing of the encoding unit based on whether or not the change amount is equal to or greater than a predetermined threshold value and based on a determination result by the reference image determination unit.

5. The image processing device according to claim 4, wherein the control unit
controls the encoding unit to execute encoding without using the parameters in a case when the change amount is equal to or greater than a predetermined threshold,
controls the encoding unit to execute encoding without using the parameters in a case when the change amount is equal to or less than a predetermined threshold and a determination by the reference image determination unit is a determination that there are changes in the reference image that is referenced when the image that is the processing target of encoding is encoded, and
controls the encoding unit to execute encoding using the parameters in a case when the change amount is equal to or less than a predetermined threshold and a determination by the reference image determination unit is a determination that there are no changes in the reference image that is referenced when the image that is the processing target of encoding is encoded.

6. The image processing device according to claim 2, further comprising:
a quantization step changing unit that changes a value of a quantization step that is included in the parameters by a subtracted amount according to the change amount computed by the change amount computation unit,
wherein the encoding unit encodes the decoded image using parameters that include the quantization step that is changed by the quantization step changing unit.

7. An image processing method of an image processing device that includes a decoding unit, an image processing unit, a control unit, and an encoding unit, the method comprising:
decoding compressed image data that is an encoded image and generates a decoded image that is decoded and parameters that relate to encoding which are calculated during encoding;
applying image processing on the decoded image which includes at least a color adjustment process by the image processing unit;
encoding the decoded image;
determining whether or not the color adjustment process has been applied on the decoded image; and
controlling the encoding to encode the decoded image according to a change amount representing a sum of magnitude of change for each pixel in the decoded image caused by the color adjustment process, including a change amount computation that changes the manner in which the change amount is computed in accordance with the image processing being applied by the image processing unit, such that the encoding unit is controlled to (a) execute encoding not using the parameters when it is determined that the change amount is equal to or greater than a predetermined threshold and (b) execute encoding using the parameters when it is determined that the change amount is less than the predetermined threshold.

8. A non-transitory computer-readable recording medium for storing a computer program that when executed on a computer controls an image processing device that includes a decoding unit, an image processing unit, a control unit, and an encoding unit, the program comprising the steps of:
decoding compressed image data that is an encoded image and generates a decoded image that is decoded and parameters that relate to encoding which are calculated during encoding;
applying image processing on the decoded image which includes at least a color adjustment process by the image processing unit;
encoding the decoded image;
determining whether or not the color adjustment process has been applied on the decoded image; and
controlling the encoding to encode the decoded image according to a change amount representing a sum of magnitude of change for each pixel in the decoded image caused by the color adjustment process, including a change amount computation that changes the manner in which the change amount is computed in accordance with the image processing being applied by the image processing unit, such that the encoding unit is controlled to (a) execute encoding not using the parameters when it is determined that the change amount is equal to or greater than a predetermined threshold and (b) execute encoding using the parameters when it is determined that the change amount is less than the predetermined threshold.

* * * * *